Sept. 29, 1953  F. J. FOUST ET AL  2,654,065
GENERATOR ARMATURE TEST
Original Filed Oct. 7, 1948  8 Sheets-Sheet 1

Fig. 1

INVENTORS
FLOYD J. FOUST
OLVEN W. CHILDRESS JR.
DWIGHT O. CRIM
ROBERT A THOMPSON
BY
ATTORNEYS

Sept. 29, 1953   F. J. FOUST ET AL   2,654,065
GENERATOR ARMATURE TEST

Original Filed Oct. 7, 1948   8 Sheets-Sheet 3

INVENTORS
FLOYD J. FOUST
OLVEN W. CHILDRESS JR.
DWIGHT O. CRIM
ROBERT A. THOMPSON
BY
ATTORNEYS

Sept. 29, 1953    F. J. FOUST ET AL    2,654,065
GENERATOR ARMATURE TEST Original Filed Oct. 7, 1948    8 Sheets-Sheet 4

Sept. 29, 1953     F. J. FOUST ET AL     2,654,065
GENERATOR ARMATURE TEST
Original Filed Oct. 7, 1948     8 Sheets-Sheet 5

INVENTORS
FLOYD J. FOUST
OLVEN W. CHILDRESS JR.
DWIGHT O. CRIM
ROBERT A. THOMPSON
BY
ATTORNEYS

Sept. 29, 1953     F. J. FOUST ET AL     2,654,065
GENERATOR ARMATURE TEST Original Filed Oct. 7, 1948     8 Sheets-Sheet 7

Fig. 22

INVENTORS
FLOYD J. FOUST
OLVEN W. CHILDRESS JR
DWIGHT O. CRIM
ROBERT A THOMPSON
BY
ATTORNEYS

Patented Sept. 29, 1953

2,654,065

UNITED STATES PATENT OFFICE 2,654,065

GENERATOR ARMATURE TEST

Floyd J. Foust, Olven W. Childress, Jr., Dwight O. Crim, and Robert A. Thompson, Anderson, Ind., assignors to General Motors Corporation, Detroit, Mich., a corporation of Delaware Original application October 7, 1948, Serial No. 53,362, now Patent No. 2,593,131, dated April 15, 1952. Divided and this application October 19, 1951, Serial No. 259,332

3 Claims. (Cl. 324—51)

This invention relates to the testing of armatures of dynamoelectric machines and its object is to provide apparatus for testing the armature for grounded circuits, open circuits and short circuits. This application is a division of application Ser. No. 53,362, now Patent No. 2,593,131. The disclosed embodiment of the invention provides mechanical means with which a dynamo armature can be easily coupled for effecting its rotation during the test and contactors engageable with its commutators and connected with electrical circuits which operate successively first, to burn out small metallic particles making a connection between the commutator bars and ground, second, to test for a permanent ground, and third, to subject the armature to a high frequency test during which the armature coils are connected with a resonant circuit inductively related to an oscillator. The high frequency test circuit includes a meter which will indicate whether the armature is good or whether any of its coils are short-circuited or open-circuited or grounded.

Further objects and advantages of the present invention will be apparent from the following description, reference being had to the accompanying drawings, wherein a preferred embodiment of the present invention is clearly shown.

Figure 1:
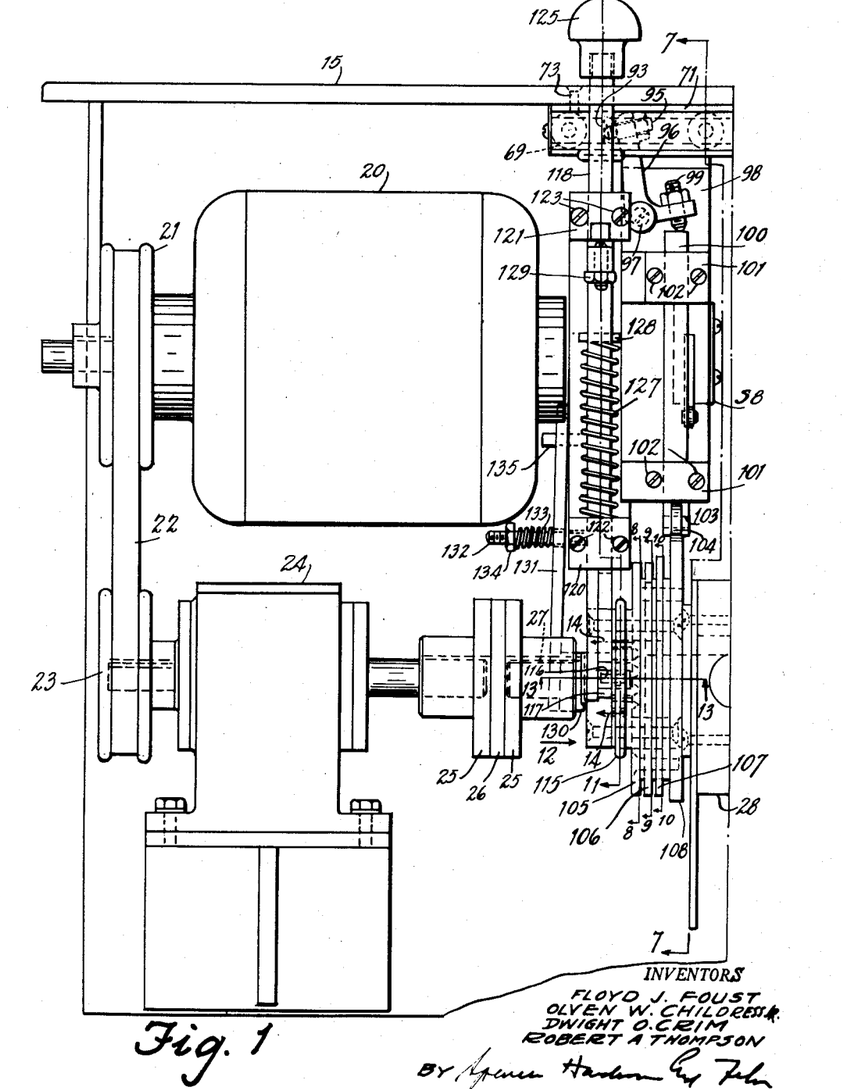
Figs. 1 and 2 together form a front elevation of a mechanism which receives and rotates the armature during the test, certain switches (shown in Fig. 3) being omitted for sake of clearness.
Figure 2:
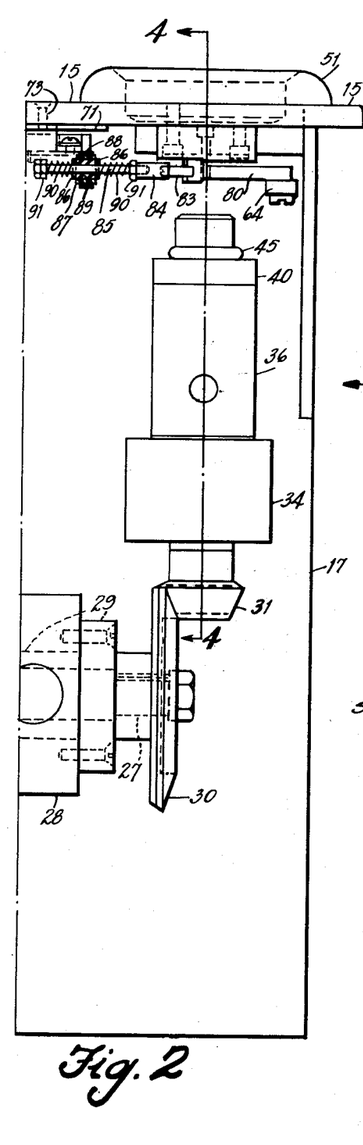
Figure 3:
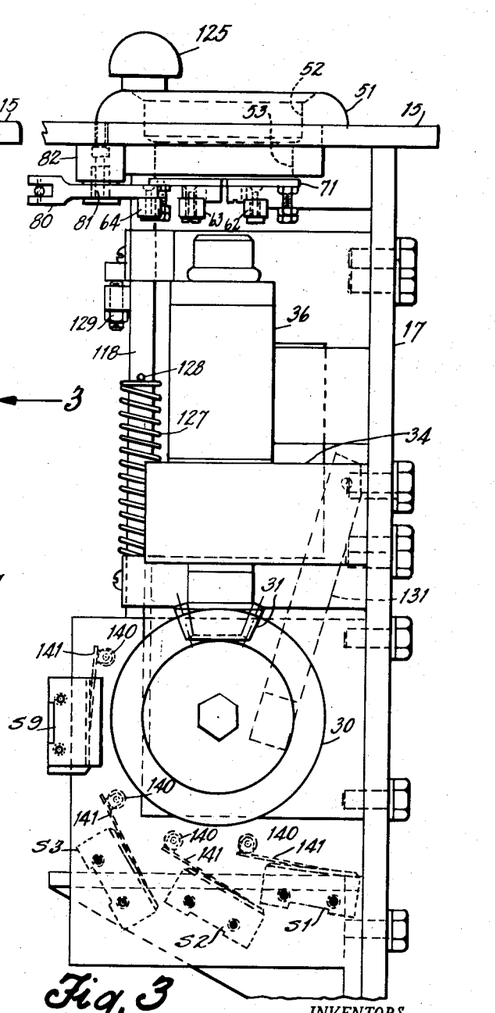
Fig. 3 is a side view in the direction of arrow 3 of Fig. 2 and includes the switches omitted in Fig. 1.
Figures 4, 6:
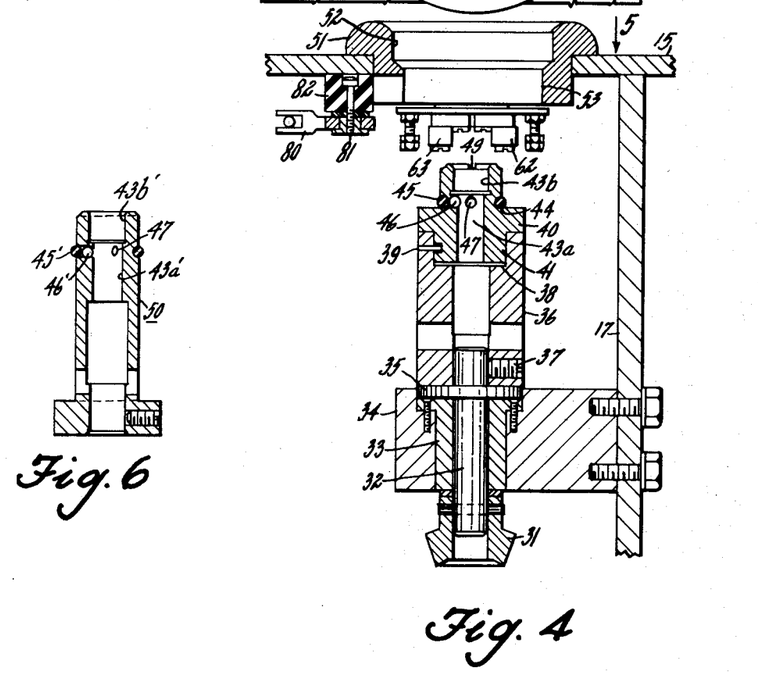
Fig. 4 is a fragmentary view on line 4—4 of Fig. 2.
Fig. 6 is a view in section of another type of adapter.

Referring to Figs. 1, 2 and 3, a plate 15 supports a plate 17 which supports an electric motor 20 (Fig. 1) which drives, through pulley 21, belt 22 and pulley 23, speed reducing gearing contained in a housing 24 and connected by coupling members 25 and an intermediate disc 26 with a shaft 27 which is journaled in a bearing 29 supported by a bracket 28. Shaft 27 is connected with a bevel gear 30 meshing with a bevel gear 31 with a shaft 32 (Fig. 4) journaled in bearing 33 supported by a bracket 34 supported by plate 17. Shaft 32 has a flange 35 which receives one end of a tubular shaft 36 secured to the shaft 32 by a screw 37. Shaft 36 provides a recess 38 and a pin 39 extending into the recess. Recess 38 is adapted to receive one of a series of adapters 40 having central bores 41 of different diameters which receive armature shafts. The adapter 40 has a shank 41 provided with a bayonet slot 42 cooperating with the pin 39 to secure the adapter to the shaft 36. The adapter 40 has a bore 43a for receiving an end portion of the armature shaft and a bore 43b of larger diameter for receiving a portion of the armature shaft of larger diameter. The adapter 40 has a groove 44 for receiving an elastic band 45 which urges inwardly a plurality of balls 46 guided by transverse holes 47. Inward movement of the balls 46 is limited by their engagement with the conical surface 48 of the adapter. The function of the balls 46 is to engage a groove or key-way slot in the armature shaft and thus provide driving engagement between it and the shaft 36. The cross slots 49 in the exposed end of the adapter 40 will receive a tool such as a wide-bit screwdriver used to tighten the bayonet slot connection between the adapter 40 and the shaft 36.

Instead of using a shaft 36 with an adapter, the shaft 50 (Fig. 6) having an integral adapter can be substituted. The parts of shaft 50 and parts associated therewith which correspond to those of the adapter 40 are designated by the same numbers with primes affixed.

Figure 5:
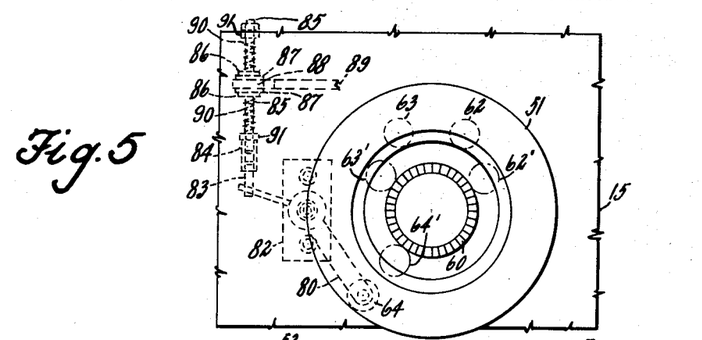
Fig. 5 is a fragmentary top view in the direction of arrow 5 of Fig. 4.
Figure 15:
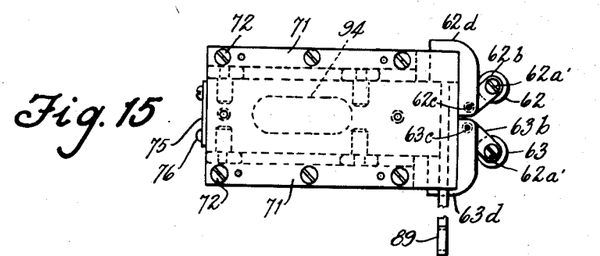
Fig. 15 is a plan view of a commutator contact roller supporting unit.
Figure 16:
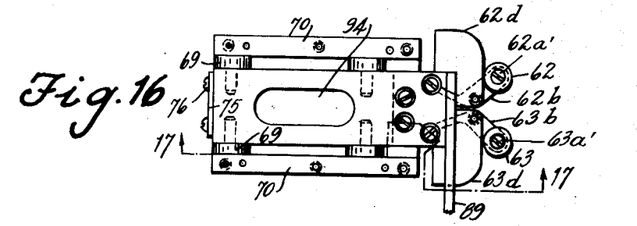
Fig. 16 is a view similar to Fig. 15 with the top plate of said unit removed.
Figure 17:
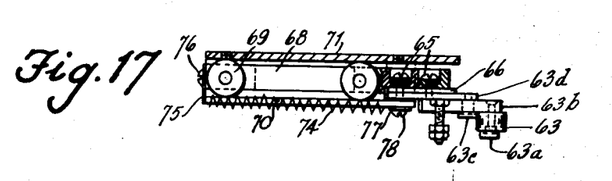
Fig. 17 is a sectional view on line 17—17 of Fig. 16.
Figures 18, 20:
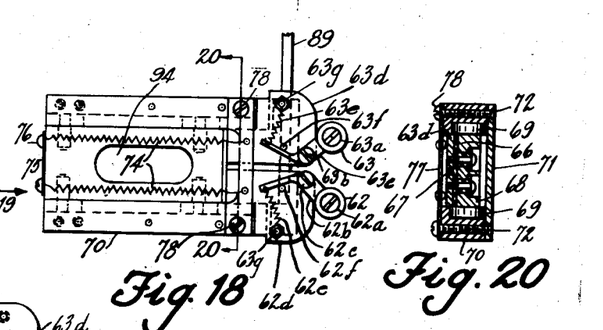
Fig. 18 is a bottom view of the unit.
Fig. 20 is a sectional view on line 20—20 of Fig. 19.
Figure 19:
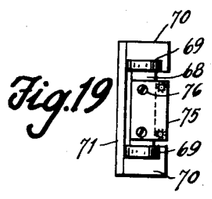
Fig. 19 is an end view in the direction of arrow 19 of Fig. 18.
Figure 21:
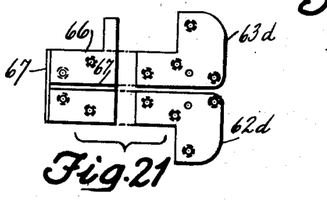
Fig. 21 is a view of a group of parts of the roller supporting unit.

Plate 15 (Figs. 4 and 5) supports a ring 51 having a bore 52 which clears the armature commutator 60 and a bore 53 which clears the wires leading from the armature coils to the commutator 60. Before the test begins, carbon contact rollers 62, 63 and 64 move from the normal positions into contacting positions 62', 63' and 64'. Rollers 62, 63 (Fig. 15) are pivoted on nuts 62a, 63a, respectively, attached by screws 62a, 63a, respectively, to arms 62b and 63b, respectively, pivotally supported by screws 62c and 63c respectively (Fig. 16), attached to metal plates 62d and 63d, respectively, which are attached by screws 65 to a carriage 68 and insulated therefrom by a non-conducting plate 66 having ribs 67 (Fig. 21). Carriage 68 has rollers 69 guided by bars 70 (Fig. 20) and a plate 71 attached to bars 70 by screws 72. Screws 73 (Figs. 1 and 2) attach plate 71 to plate 15. The carriage 68 is urged right (Figs. 1, 2 and 17) by springs 74, (Figs. 17 and 18) each attached at one end to a plate 75 which screws 76 attach to carriage 68 and at the other end to a clip 77 which screws 78 attach to the carriage 68. When permitted to do so, springs 74 urge the carriage toward the right or down in Fig. 5 to cause the rollers 62 and 63 to engage the commutator 60 and to be spread apart so as to move in a position 62' and 63'. This spreading of the rollers is resisted by springs 62e and 63e, respectively (Fig. 18), connecting the arms 62b and 63b, respectively, with the screws 62g and 63g attached to plates 62d and 63d, respectively, and urging the arms into engagement with pins 62f and 63f, respectively. The roller 64 is pivotally supported by a lever 80 (Figs. 2, 4 and 5) which is pivotally supported by a screw 81 attached to an insulator 82 attached to plate 15. Lever 80 is pivotally connected with a screw 83 (Figs. 4 and 5) threadedly connected with a sleeve 84 which is threadedly connected with a rod 85 which passes through five non-conducting washers, two of which numbered 86, are at the ends of the group, washers 87 next to the ends and an intermediate washer 88 supported by an arm 89 which as shown in Fig. 16 is integral with or attached to the carriage 68. The rod 85 is surrounded by springs 90 confined between the end washers 86 (Fig. 2) and nuts 91 threaded on rod 85. The function of springs 90 is normally to center the rod 85 relative to the arm 89.

Movement of the carriage 68 toward the commutator causes the roller 64 to move into position 64' concurrently with movement of rollers 62 and 63 into engagement with the commutator.

Figure 7:
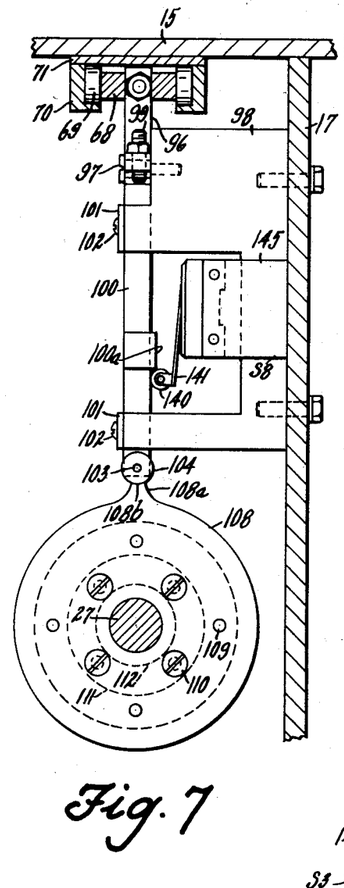
Figs. 7, 8, 9, 10 and 11 are sectional views taken, respectively, on lines 7—7, 8—8, 9—9, 10—10 and 11—11 of Fig. 1.

The rollers 62, 63 and 64 are normally held out of engagement with the commutator by the engagement of left end surface 93 (Figs. 1 and 16) of a slot 94 with a screw 95 carried by a lever 96 attached to a bracket 98 attached to plate 17 (see also Fig. 7). Lever 96 carries a screw 99 engageable with a bar 100 which is guided for vertical movement in grooves provided by bracket 98 and is retained by plates 101 secured by screws 102 to bracket 98. At its lower end, the bar 100 carries a pin 103 supporting a roller 104 normally received by a recess 108b in the lobe 108a of a cam plate 108. In the normal position of cam 108, shown in Fig. 7, the carriage 68 is caused to be retained in the position shown in Figs. 1 and 2 against the action of springs 74 (Fig. 18) so that the rollers 62, 63 are normally held out of engagement with the commutator 60.

Figures 11, 12, 13, 14:
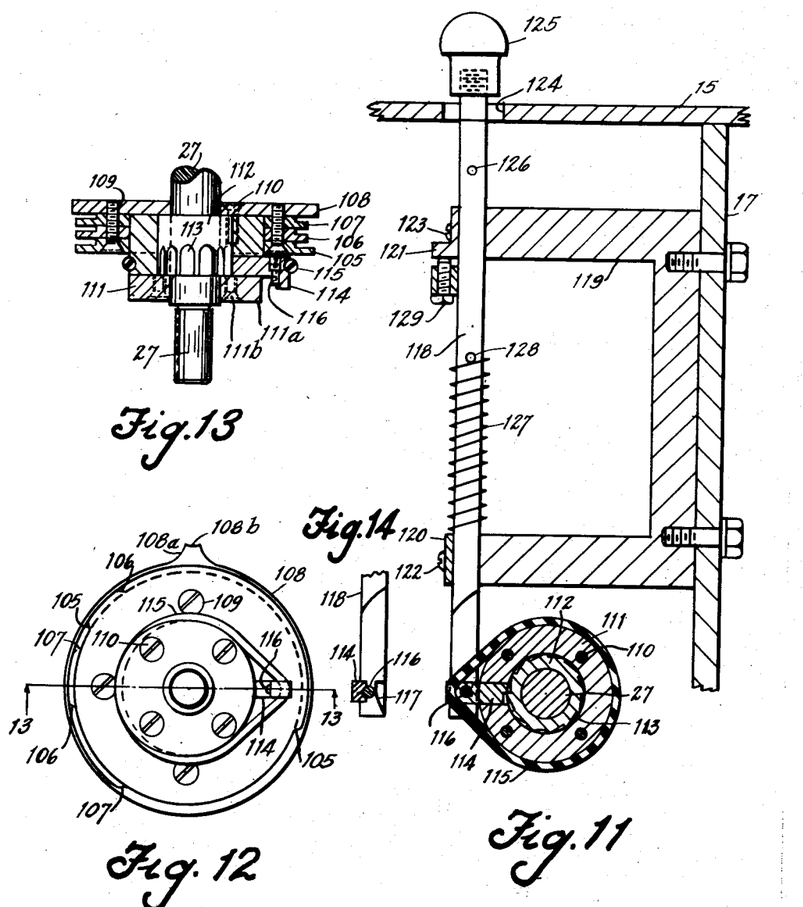
Fig. 12 is a view in the direction of arrow 12 of Fig. 1.
Fig. 13 is a sectional view on line 13—13 of Fig. 12.
Fig. 14 is a fragmentary sectional view on line 14—14 of Fig. 11.

Referring to Fig. 13, screws 109 secure to cam 108, cams 105, 106 and 107 and screws 110 secure cam 108 to a hub 111 which is journaled on a clutch member 112 attached to shaft 27 and located between cam 108 and a disc 111a which screws 111b attach to hub 111. Hub 111 is slightly wider than the member 112. Member 112 has clutch teeth 113 which are adapted to be engaged by a clutch dog 114 (Fig. 11), which an elastic band 115 urges toward the clutch member 112. The dog 114 carries a rod or pin 116 adapted to be engaged by a clutch throw-out cam 117 provided by a bar 118 which is guided for vertical movement by a bracket 119 (Fig. 11) attached to plate 17, the bar being retained by plates 120 and 121 secured to the bracket by the screws 122 and 123 respectively. Bar 118 extends through a hole 124 in plate 15 and carries a handle or knob 125. By pushing the knob 125 down, the bar 118 moves down until the stop pin 126 strikes the bracket 119; and, during this movement, the clutch throw-out cam 117 is moved away from the path of movement of the pin 116 and dog 114 can move right (Fig. 11) under the action of band 115 in order to connect the shaft 27 with the drum 111 and the cams 105, 106, 107, 108 connected therewith. Normally the dog is held out of engagement with the clutch member 112 by a spring 127 confined between a portion of the bracket 119 and the pin 128 attached to the bar 118. Spring 127 pushes the bar upwardly until a screw 129 carried thereby strikes the plate 121.

An instant after the knob 125 is pushed down the drum 111 starts rotating to move the pin 116 (Fig. 14) away from the cam 117. Then the knob 125 can be released so that the cam 117 will be returned to its clutch throw-out position so that the drum 111 will make one revolution. During this revolution cam 108 makes one revolution to permit the carriage to move toward the commutator so that the rollers 60, 62 and 64 will engage it. Coincidentally with the engagement of cam 117 with the pin 116 to disengage the clutch, the cam 108 has arrived in such position as to cause the carriage to be retracted and to present the groove 108b for engagement by the roller 104 (Fig. 7). In order that the cam 108 will not be moved past its position a brake is provided. This brake comprises a shoe 130 (Fig. 1) attached to a bar 131 providing a hole for receiving a stud 132 threaded into the bracket 119 and surrounded by a spring 133 confined between the bar 131 and a nut 134 threaded on the stud. Near its upper end bar 131 has a hole which receives a pin 135 which, as shown in Fig. 3, is attached to bracket 119. During the test the cams 105—108 make one revolution and then stop and during that time the tested armature is rotated sufficiently for the required test.

Figure 8:
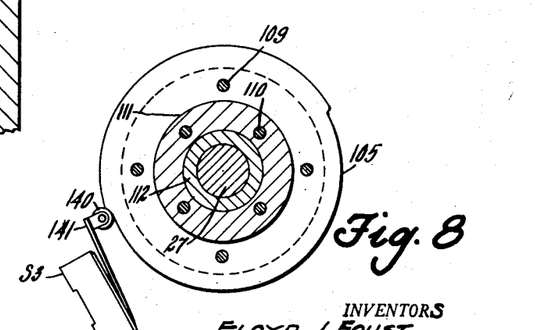
Figure 9:
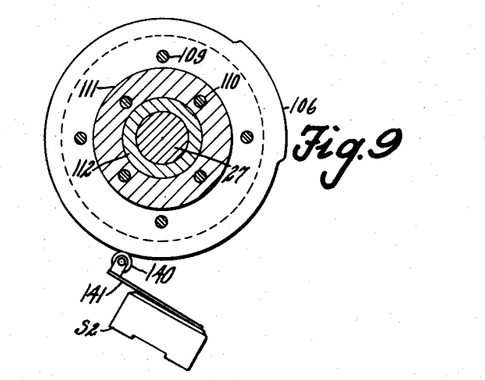
Figure 10:
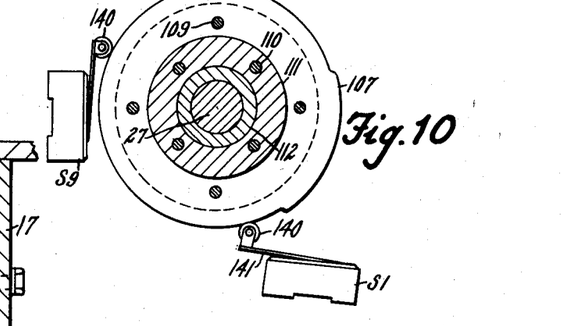

The testing apparatus includes switches S3, S2 and S1 which are operated respectively by cams 105, 106 and 107 (Figs. 8, 9 and 10 respectively). Cam 107 (Fig. 10) operates also a switch S9. Each of these switches has a roller 140 supported by blade 141 for operating a switch contact actuator. The switches S1, S2, S3 and S9 are supported by a plate 144 (Figs. 1, 3) attached to bearing bracket 28. A switch S8 (Figs. 1, 7) supported by a plate 145 attached to bracket 98 has its operating roller 140 engageable with the lug 100a provided by bar 100. Switch S8 is normally closed all during the test cycle and switches S1, S2, S3, S9 are normally open switches closed at different times during the test cycle.

Figure 22:
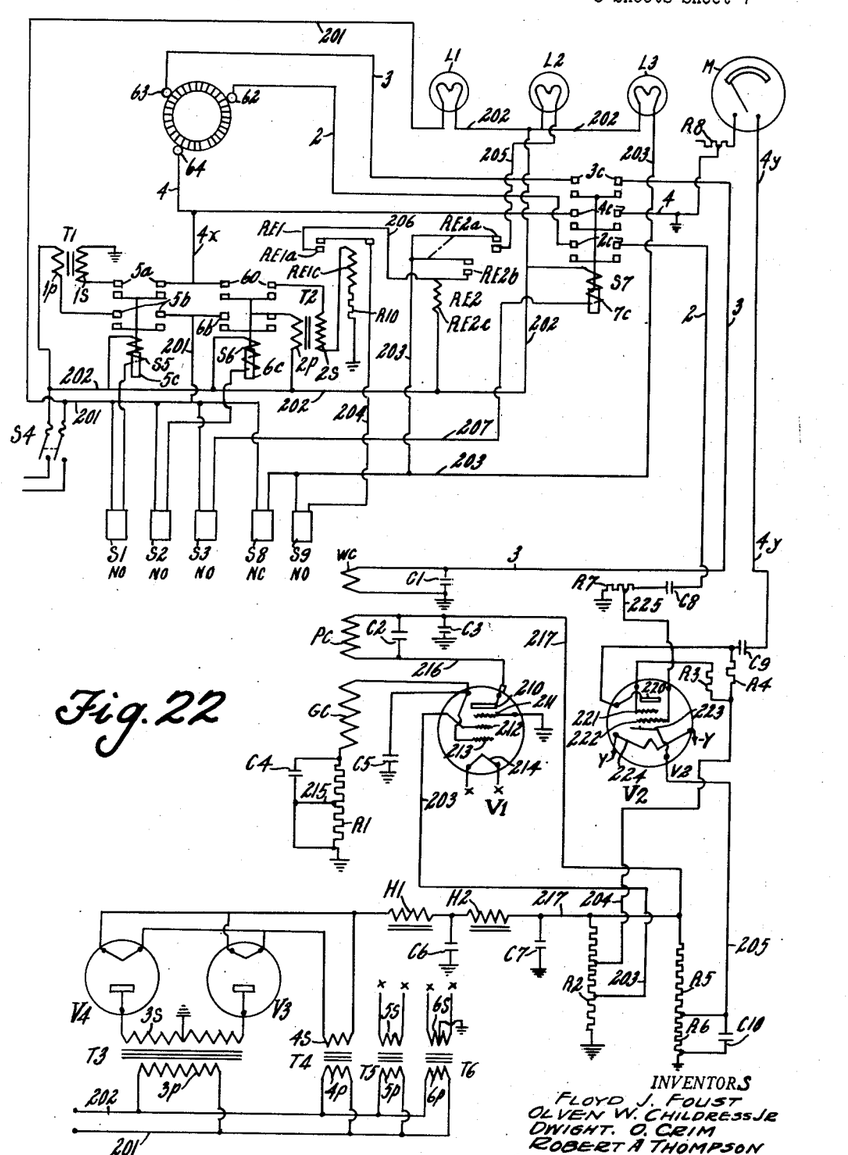
Fig. 22 is a wiring diagram of electrical apparatus including the testing circuits.

Before starting to test, switch S4 (Fig. 22) is closed to connect a current source (at 110 v. A. C. for example) with wires 201 and 202. Lamp L1 shows green to show that S4 has been closed. If switch S8 is closed as it should be when the test cycle starts, lamp L3 shows yellow. At the end of the test cycle, the lamp L3 goes out to indicate the test cycle has ended.

To test an armature after it is connected with the shaft 36, the knob 125 is pressed down to start the cams rotating and the rollers 62, 63 and 64 are advanced into engagement with the commutator 60 and then switch S1 is closed which connects coil 5c of switch S5 with wires 201 and 202. Switch S5 then bridges its contacts 5a and 5b, thereby connecting primary coil 1p of transformer T1 with wires 201 and 202 and connecting secondary coil 1s by wires 4x and 4 with roller 64. This applies 50 volts to the commutator segments which are connected together by the armature coils. The application of this voltage causes the burning out of any metal particles which might connect the bars of the commutator with the metal core of the commutator which is grounded through the apparatus.

Then switch S1 opens to effect opening of switch S5 and switch S2 closes to connect coil 6c of switch S6 with wires 201 and 202 which causes switches S6 to bridge its contacts 6a and 6b, thereby connecting primary coil 2p of transformer T2 with wires 201 and 202 and connecting secondary coil 2s of transformer T2 with contact roller 64 through wires 4x and 4 and connecting coil 2s with ground through coil relay RE1c and resistance R10 with ground. This causes the application of 500 volts to the commutator. If the commutator is not grounded coil RE1c is not energized and relay RE1 does not close. If the commutator is grounded, contacts RE1a of relay RE1 close. Coil RE2c of relay RE2 is energized through the following circuit: Wire 201, normally closed switch S8 (remaining closed until near the end of the cycle), switch S9 (normally open but closed by cam 107 near the end of the ground test), contacts RE1a of relay RE1, wire 206, coil RE2c of relay RE2 and wire 202. Relay RE2 closes its contacts RE2a and RE2b; and when, contacts RE2b are closed, RE2c remains energized through the following circuit independent of contacts RE1a of relay RE1, wire 201, switch S8, wire 203, contacts RE2b, coil RE2c, wire 202. When contacts RE2a close red lamp 12 burns through the following circuit: Wire 201, switch S8, wire 203, contacts RE2a, wire 205, lamp 12, wire 202. Lamp 12 burns red to indicate ground and remains closed until switch S8 opens near the end of the cycle. In case there is no ground, lamp 12 does not burn.

The last event in the cycle is known as the "high frequency test." Before describing that test, the high frequency apparatus will be described. There is a power pack including transformers T3, T4, T5 and T6 whose respective primary windings 3p, 4p, 5p, 6p are connected with wires 201 and 202. Secondary 3s of transformer T3 is center-tapped to ground and its ends are connected with the plates of rectifier tubes V3 and V4 whose cathodes are heated by current furnished by secondary winding 4s of transformer T4. The rectified current from tubes V3 and V4 is filtered by network comprising chokes H1 and H2 and condensers C6 and C7; and the filtered current passes along wire 217 to variable voltage divider resistance R2 and to fixed divider resistances R5 and R6.

Wire 203 connects resistance R2 with grid 212 of tube V1. Wire 204 connects resistance R2 with resistances R3 and R4 connected respectively with grid 221 of tube V2 and with condenser C9 also connected with plate 220 of tube V2. One terminal condenser C10 is connected with ground of resistance R6 and its other terminal is connected with the junction of resistances R5 and R6 and with wire 205 connected with the cathode 223 of tube V2. The cathode heater 224 of this tube is connected through connections y, y with the similarly marked terminals of secondary winding 5s of transformer T5. The secondary winding 6s of transformer T6 is center tapped to ground and is connected as indicated by x, x with cathode 214 of tube V1. Grid 213 of tube B1 is connected with ground through condenser C5 and is also connected with a grid coil GC connected with adjustable resistance R1 which is grounded and has its junction with coil GC connected with one terminal of condenser C4 and whose other terminal is connected with ground and also with a wiper 215 adjustable along resistance R1. Grid 211 of tube V1 is grounded. Plate 210 of tube V1 is connected by wire 216 with terminals of condenser C2 and a plate coil PC whose other terminals are connected with wire 217 which is connected with the power pack. Wire 217 is also connected with ground condenser C3.

The network which includes tube V1 and coils GC and PC provide what is generally known as an Armstrong oscillator. Coils PC and GC and a work coil WC are inductively related by concentric location. The oscillator is adjusted for a suitable frequency, for example 5 kc. per second. One end of coil WC is connected with the grounded end of condenser C1 which wire 3 connects with the other terminal coil WC and with the commutator contacting roller 63 through contacts 3c which are bridged when coil 7c of switch S7 is energized. When contacts 2c of switch S7 are bridged, contact roller 62 is connected by wire 2 with a condenser C8 connected with resistance R7 which is grounded and which has a wiper 225 connected with grid 222 of tube V2. When contacts 4c of switch S7 are bridged contact roller 64 is connected by wire 4 with ground and through a variable resistance R11 with a meter M connected by wire 4y with a terminal of condenser C9 whose other terminal is connected with plate 220 of tube V2.

Figure 23:
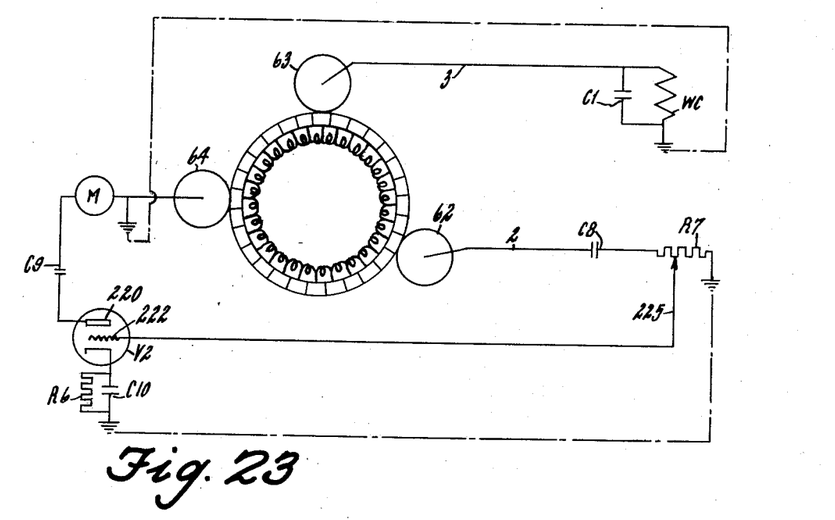
Fig. 23 is a portion of the diagram of Fig. 22 showing its connections with commutator segments.
Figure 24:
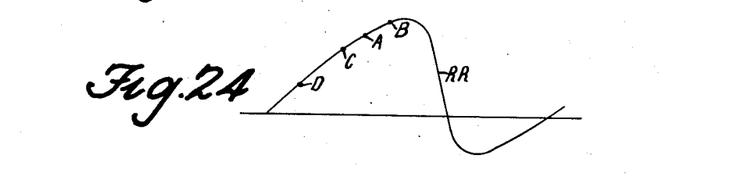
Fig. 24 is a diagram of a resonant curve.
Figure 25:
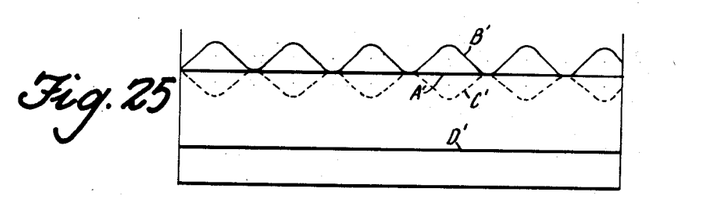
Fig. 25 is a diagram showing meter readings under different conditions.

The high frequency test is started by the closing of switch S3 which connects coil 7c of relay switch S7 with wires 201 and 202 to effect the bridging of pairs of contacts 2c, 4c and 3c for the purpose of completing the circuits between the commutator engaging rollers and the test circuit. A portion of the test circuit is shown in Fig. 23 in simplified form. The input circuit may be considered to include the grounded end of coil WC, wire 3, contact roller 63, the contacted commutator bars, armature coils ac between roller 63 and roller 64, wire 4 and its ground connection with the coil WC. The output or meter circuit includes contact roller 64, wire 4 meter M, condenser C9, tube V2, condenser C10, ground to resistance R7, condenser C8, wire 2 and contact roller 62 and armature coils ac between rollers 62, 64. The reading of the meter M is under control by tube V2 whose grid 222 is connected with wiper 226 of resistance R7. If the armature is good, that is, it has no open circuited coils, short-circuited coils and no grounded coils, it combines with work coil WC and condenser C1 to provide a circuit which has a resonance approaching full resonance with respect to the oscillator. In Fig. 24, curve RR represents relative resonance. If the armature is good, point A on curves RR represent the relative resonance of the armature and work coil circuit to the oscillator. Point A is well up on the gradual scope of the resonance curve but is somewhat below the maximum. If the armature is good the meter reading is of a substantial constant even though the armature is rotating slowly and adjustment of resistance R11 can be made so that the meter will read, for example, as represented by line A' in Fig. 25 90 units. If the armature has one or more open circuited coils, the relative resonance will increase to B on curve RR; and the meter needle will fluctuate between 90 units and an increased reading of 110, for example, as represented by line B' in Fig. 25. If the armature has shorted turns, its relative resonance will be decreased to a value represented by point C on curve RR; and the meter needle will fluctuate between 90 units and a lower value such as 70 units, for example, as represented by line C', Fig. 25. If the armature is grounded, the relative resonance will be decreased to a much lower value such as represented by point D on curve RR; and the meter will read a much lower value, for example 30 units, as represented by line D' in Fig. 25.

The voltage impressed on grid 222 of tube V2 is under control by the resonance of the work coil circuit relative to the oscillator circuit. If the relative resonance is greater than normal for a good armature, such as value B, grid 222 is so biased as to permit tube V2 to pass more current hence the meter M will read higher. When the relative resonance is less than normal grid 222 is so biased as to permit tube V2 to pass less current and the reading of meter M will be lower.

The high frequency test provides for detection of good, open-circuited, shorted or grounded armature by the use of resonance comparing means comprising a first circuit including a condenser and a coil subjected to high frequency and a second or armature circuit including armature coils, a second condenser and a second coil connected therewith and inductively coupled with the coil of the first circuit and a device for indicating the degree of resonance of armature circuit with respect to the first circuit. A meter capable reading from 0 to 1 milli-amperes, when used with an amplifier is a suitable indicating device. Its scale should be read from 0 to 120 units.

Other suitable electrical values are as follows:

| | |
|---|---|
| Condensers C1, C2, C3 | 2 mfd., 1000 volts |
| Condenser C4 | 1 mfd., 600 volts |
| Condenser C5 | .02 mfd. 600 volts |
| Condensers C6, C7, C8 | 2, mfd., 1000 volts |
| Condenser C9 | 1 mfd., 600 volts |
| Condenser C10 | 50 mfd., 150 volts |
| Resistance R1 | 25,000 ohms, 50 watts |
| Resistance R2 | 5000 ohms, 200 watts |
| Resistance R3 | 10,000 ohms, 10 watts |
| Resistance R4 | 10,000 ohms, 600 volts |
| Resistance R5 | 50,000 ohms, 100 watts |
| Resistance R6 | 750 ohms, 20 watts |
| Resistances R7, R8 | 250,000 ohms, 1 watt |
| Chokes H1, H2 | 10 henries, 200 milliamps. |
| Transformer T1 | 50 volts, 1000 V. A. |
| Transformer T2 | 500 volts, 5 V. A. |
| Transformer T3 | 1100 volts, 200 ma. center tap. |
| Transformer T4 | 2.5 volts, 5 amp. |
| Transformer T5 | 6.3 volts, 3 amp. |
| Transformer T6 | 10.0 volts, 10 amp. center tap. |
| Tube V1 | #813 |
| Tube V2 | #6L6 |
| Tubes V3, V4 | #816 |

Figure 26:
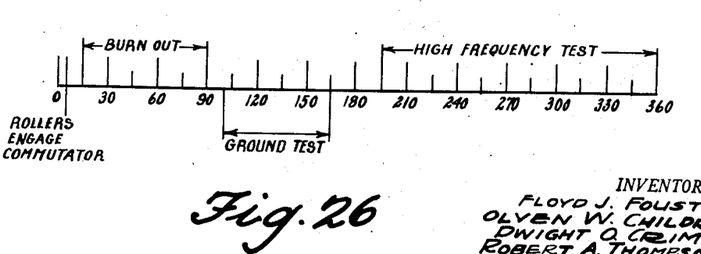
Fig. 26 is a timing chart.

Fig. 26 shows the timing of the apparatus relative to motion of cams 105, 106, 107, 108 for one revolution. The zero positions of these cams are shown in Figs. 7 to 10. At about 7°, the rollers 62, 63, 64 begin to advance to the commutator. From 15° to 90° the commutator is subjected to "burn out" voltage. From 100° to 165°, the armature is subjected to the ground test. From 195° to about 360° the armature is subjected to the high frequency test. During one revolution of the cams, the armature rotates about three times at a rate of about 10 R. P. M.

While the embodiment of the present invention as herein disclosed, constitutes a preferred form, it is to be understood that other forms might be adopted.

What is claimed is as follows:

1. Apparatus for testing an armature which includes a shaft, a core and a commutator assembled with the shaft and coils assembled with the core and connected with bars of the commutator, a rotatable chuck for receiving and driving the armature shaft and providing a ground connection therefor, a driving shaft, gearing connecting the driving shaft with the chuck to impart to the latter rotative speed greater than the speed of the former, contacts engageable with the commutator at spaced points, and means operated by the driving shaft during one revolution thereof for causing the contacts to engage the commutator and for successively establishing connections between test circuits and one or more of the contacts.

2. Apparatus for testing an armature which includes a shaft, a core and a commutator assembled with the shaft and coils assembled with the core and connected with bars of the commutator, a rotatable chuck for receiving and driving the armature shaft and providing a ground connection therefor, a driving shaft, gearing connecting the driving shaft with the chuck to impart to the latter rotative speed greater than the speed of the former, contacts engageable with the commutator at spaced points, a cam support mounted on the driving shaft, a one-revolution clutch for connecting the driving shaft with the cam support, manually operable means for tripping the clutch, cams mounted on the support, and devices respectively operated by the cams during one revolution thereof for causing the contacts to engage the commutator and for successively establishing connections between test circuits and one or more of the contacts.

3. Apparatus for testing an armature which includes a shaft, a core and a commutator assembled with the shaft and coils assembled with the core and connected with bars of the commutator, a rotatable chuck for receiving and driving the armature shaft and providing a ground connection therefor, a driving shaft, gearing connecting the driving shaft with the chuck to impart to the latter rotative speed greater than the speed of the former, contacts engageable with the commutator at spaced points, a cam support mounted on the driving shaft, a one-revolution clutch for connecting the driving shaft with the cam support, manually operable means for tripping the clutch, cams mounted on the support, a carriage supporting two of the contacts and movable to cause them to engage the commutator, means supporting the third contact, a mechanism operated by the carriage for actuating said third contact support to cause it to move said third contact into engagement with the commutator when the carriage moves its contacts into engagement with the commutator and devices respectively operated by the cams for causing movement of the carriage and for successively establishing connections between test circuits and one or more of the contacts.

FLOYD J. FOUST.
OLVEN W. CHILDRESS, Jr.
DWIGHT O. CRIM.
ROBERT A. THOMPSON.

References Cited in the file of this patent

UNITED STATES PATENTS

| Number | Name | Date |
| --- | --- | --- |
| 1,906,030 | Whelchel | Apr. 25, 1933 |
| 2,599,960 | Weichsel | June 10, 1952 |